United States Patent [19]

Morris

[11] 4,304,609
[45] Dec. 8, 1981

[54] DRILL CUTTINGS TREATMENT APPARATUS AND METHOD

[76] Inventor: James B. N. Morris, 22 Colony Rd., Gretna, La. 70053

[21] Appl. No.: 125,531

[22] Filed: Feb. 28, 1980

[51] Int. Cl.³ .............................................. B08B 7/00
[52] U.S. Cl. .................................... 134/19; 134/25.1; 175/206; 175/207; 202/118; 219/10.69
[58] Field of Search ................. 134/19, 25.1; 175/206, 175/207; 202/118; 201/19, 25; 219/10.69, 10.79, 10.57; 159/DIG. 1, DIG. 26

[56] References Cited

U.S. PATENT DOCUMENTS

| | | | |
|---|---|---|---|
| 1,604,253 | 10/1926 | Barnhart | 202/118 |
| 1,712,083 | 5/1929 | Koppers | 202/118 |
| 1,810,828 | 6/1931 | Hayes | 202/118 X |
| 1,884,379 | 10/1932 | Tenney | 202/118 |
| 2,078,914 | 4/1937 | Daubert | 202/118 X |
| 2,620,286 | 12/1952 | Shaw | 134/20 X |
| 2,722,589 | 11/1955 | Marquardt | 219/10.69 X |
| 3,616,266 | 10/1971 | Hall et al. | 202/118 |
| 3,705,285 | 12/1972 | Cachat | 219/10.69 X |
| 4,098,648 | 7/1978 | Kraemer et al. | 208/11 LE X |
| 4,139,462 | 2/1979 | Sample | 175/206 X |
| 4,210,491 | 7/1980 | Schulman | 202/118 X |

*Primary Examiner*—Marc L. Caroff

*Attorney, Agent, or Firm*—Murray and Whisenhunt

[57] ABSTRACT

Hydrocarbons are removed from solids such as drill cuttings in apparatus including a rotating cylindrical retort vessel having a counter rotating auger-type conveyor therein, the auger-type conveyor is eccentrically located at the bottom of the vessel, the vessel is heated by an induction heating coil surrounding the vessel and traveling along the length thereof, and a retention device is inserted at the downstream end of the retort vessel in order to impede the discharge of solids traveling therethrough, to ensure more complete hydrocarbon removal, and the apparatus includes a general assembly of a pair of retort vessels, each with a counter rotating auger-type conveyor therein, located generally in the same vertical plane, with the downstream end of the upper vessel being in communication with the upstream end of the lower vessel.

The method and apparatus find particular utility on off-shore oil and gas wells, wherein the drill cuttings can be rendered environmentally acceptable by removal of hydrocarbons therefrom, so that the drill cuttings can be simply discharged overboard without environmental pollution, and the hydrocarbon removal step is accomplished with reduced risk of fire and/or explosion.

17 Claims, 6 Drawing Figures

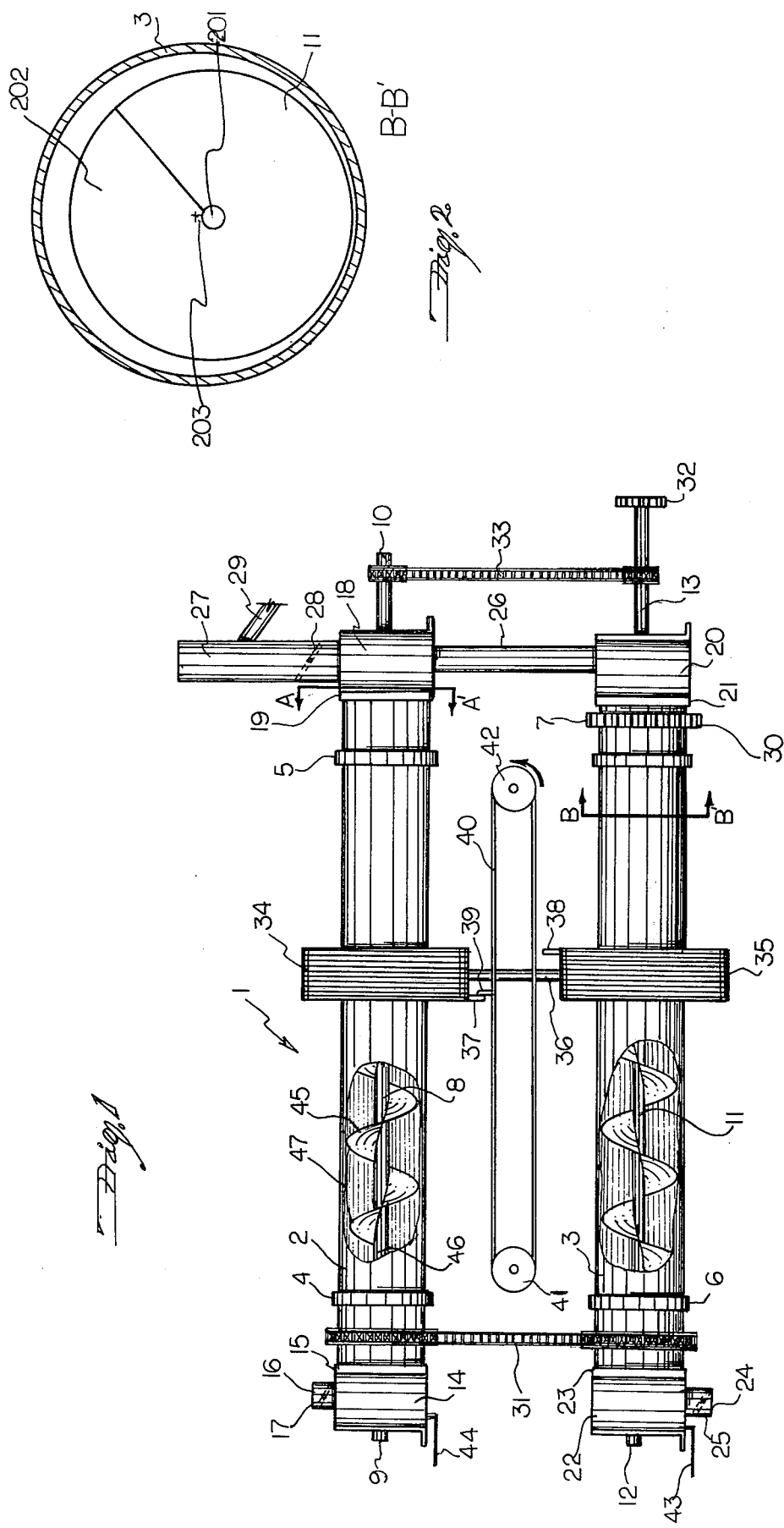

DRILL CUTTINGS TREATMENT APPARATUS AND METHOD

BACKGROUND OF THE INVENTION

In the drilling of oil and/or gas wells, it sometimes becomes necessary to place oil or other hydrocarbons in the drilling fluid for various downhole drilling conditions. When the drill cuttings reach the surface together with the drilling fluid, they are separated by passage over conventional equipments such as shakers. When using drilling fluids which are not based upon oil or other hydrocarbons, the drill cuttings can be disposed of by overboard disposal (if off-shore) or by land fill operation if the drilling is on land. However, if oil or other hydrocarbons are used in the drilling fluid, the hydrocarbon soaked drill cuttings can not be thrown overboard because of environmental pollution. As of the current date, many measures have been proposed, but the only solution used by the drilling industry to date for off-shore drilling is to catch the drill cuttings and by bulk process send the drill cuttings to land for disposal. It is very expensive to send the drill cuttings to land, and many more wells would be drilled if it were economical to drill with an oil-based drilling mud or fluid.

U.S. Pat. No. 3,658,654 is directed to an apparatus for recovering oil from oil shale and similar solid materials. The oil is removed from solids by a simple pyrolysis process, in the presence of hyrogen to prevent the formation of high molecular weight materials. The oil bearing solids are passed through an elongated substantially horizontal pyrolysis vessel having an auger-type conveyor therein. During passage through the pyrolysis vessel, the oil bearing solids are heated, and the heating means may comprise a furnace or electrical heating coils.

U.S. Pat. No. 4,098,648 discloses a rotatably retort tube having an internal helical member which is fixed to the tube so that no relative rotation is possible. The patent is directed to the solvent extraction of tar sands and oil bearing shale materials, and seeks to overcome a problem regarding the removal of residual solvent from the already substantially oil free material, before returning the material to the environment. The patent uses a solvent recovery vessel where the solvent is heated and pumped away, and it is unnecessary to raise the temperature much above 200° F. to effect satisfactory evaporation of the solvent. Induction heating is suggested for the heating of the solvent.

U.S. Pat. No. 1,739,066 discloses a device incorporating a counter rotating auger within a rotating drum. The patented device is primarily intended for mixing together particulate materials such as stockfeed, cement, fertilizers, and the like, and discloses that the counterrotating produces a good mixing effect.

U.S. Pat. No. 4,094,769 discloses an auger/retort system for recovering oil from shale and similar materials. The retort is not rotatable, and may be heated using electrical resistance strip heaters extending longitudinally along the retort. The device is provided with an insulation material which is spaced from and completely surrounds the retort to provide good insulation properties, as well as a safety shield for the strip heaters.

U.S. Pat. Nos. 2,973,312, 3,997,388, and 3,652,447 disclose different methods for heating material in a retort. The first two patents disclose the use of ultrasonic and/or microwave heating, and U.S. Pat. No. 3,652,447 suggests the pyrolytic recovery of oil by the use of pulsed laser beams.

Other patents further illustrating the background of the present invention includes U.S. Pat. Nos. 4,077,868 and 3,616,266.

SUMMARY OF THE INVENTION

The present invention includes a method and apparatus for removing oil or other hydrocarbons from solids, and especially from drill cuttings, using a rotatable retort vessel having a counter-rotating auger-type conveyor therein. The apparatus includes a cylindrical substantially horizontal retort vessel having the aforesaid counter-rotating conveyor therein, a feed device for introducing hydrocarbon-containing drill cuttings into the vessel, a discharge device for discharging solids and hydrocarbon gases from the vessel, and a heater, preferably an induction heating coil, for heating the hydrocarbon containing solids during passage through the vessel to separate the hydrocarbons from the solids. In another embodiment, the auger-type conveyor is eccentrically located in the vessel toward the bottom portion thereof to provide improved material scraping from the vessel bottom. In another embodiment, the heating means is an induction heating coil which surrounds the vessel and travels along the length thereof during heating operation, so as to avoid the formation of hot spots. In another embodiment, a retention plate is provided at the discharge end of the auger-type conveyor for retaining the drill cuttings or other solids moving through the vessel against the tendency for downstream movement caused by the conveyor, to thereby ensure more complete hydrocarbon removal from the solids. In yet another embodiment, the apparatus includes two rotatable retort vessels having counter-rotating auger-type conveyors therein. One of the retort vessels is located vertically above the other retort vessel, and the discharge end of the upper retort vessel is in open communication with the upstream or feed end of the lower vessel.

DETAILED DESCRIPTION OF THE INVENTION

Figure 3:
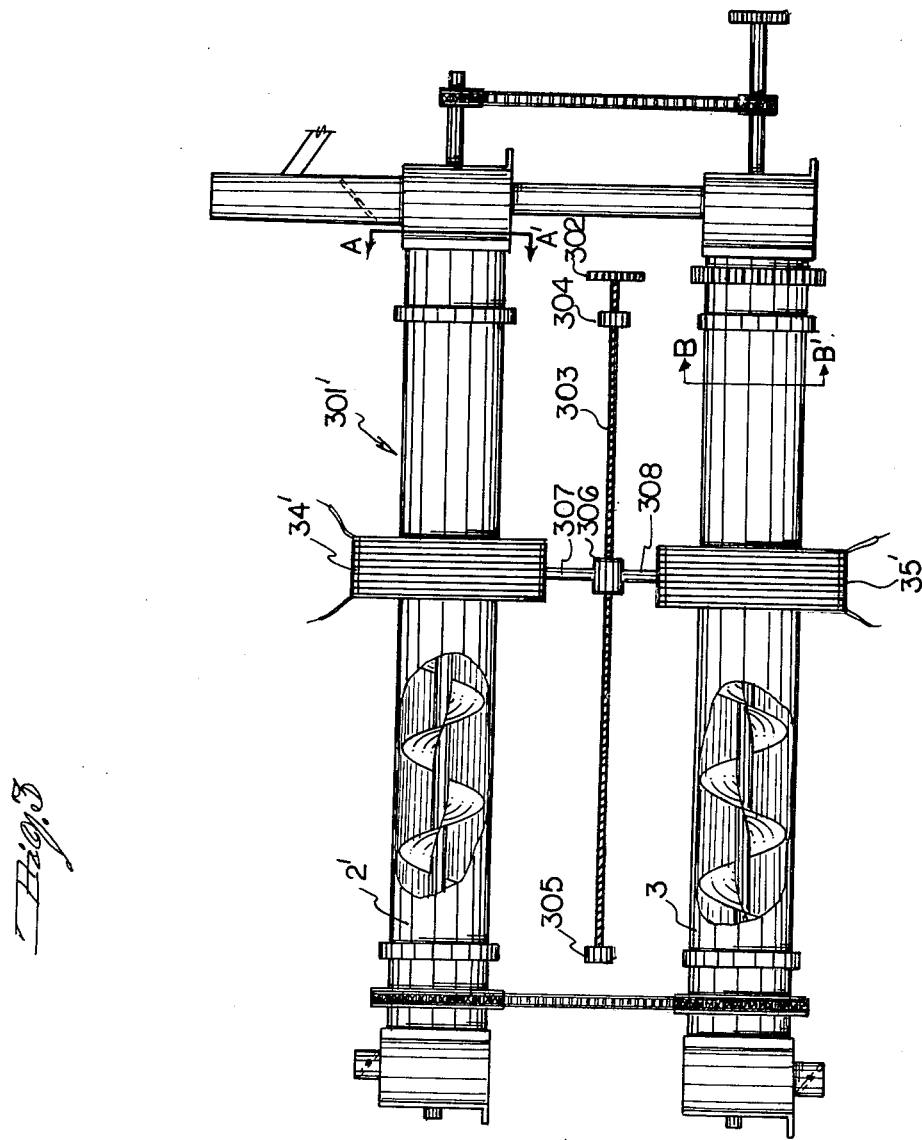

The present invention will be more clearly understood with reference to the accompanying drawings, wherein FIG. 1 is a schematic view of the general arrangement of the apparatus, suitable for use on an off-shore drilling platform, FIG. 2 is a cross-sectional view of the apparatus of FIG. 1, taking along lines A–A', FIG. 3 is a schematic view of an alternative embodiment of the present invention.

Figure 4:
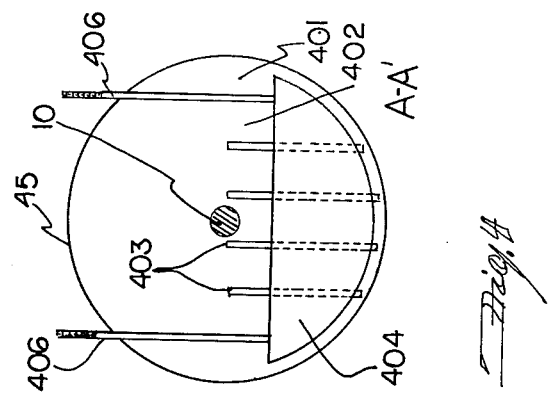
Figure 5:
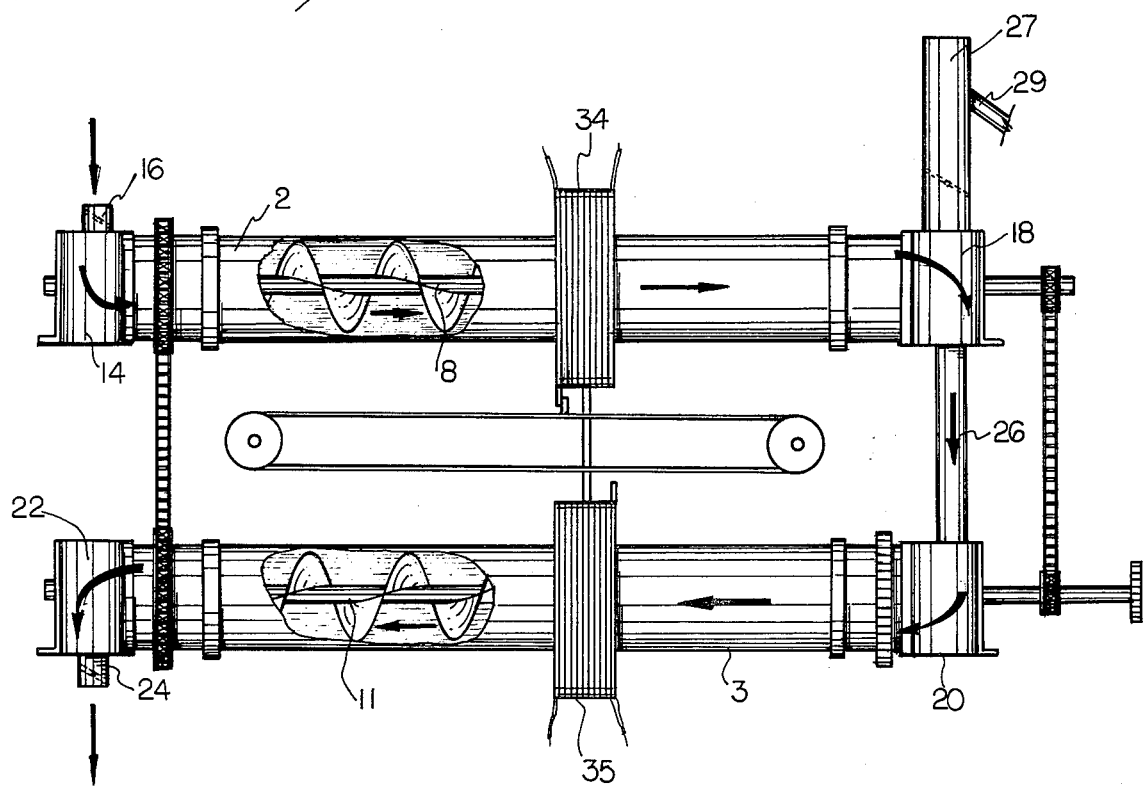
Figure 6:
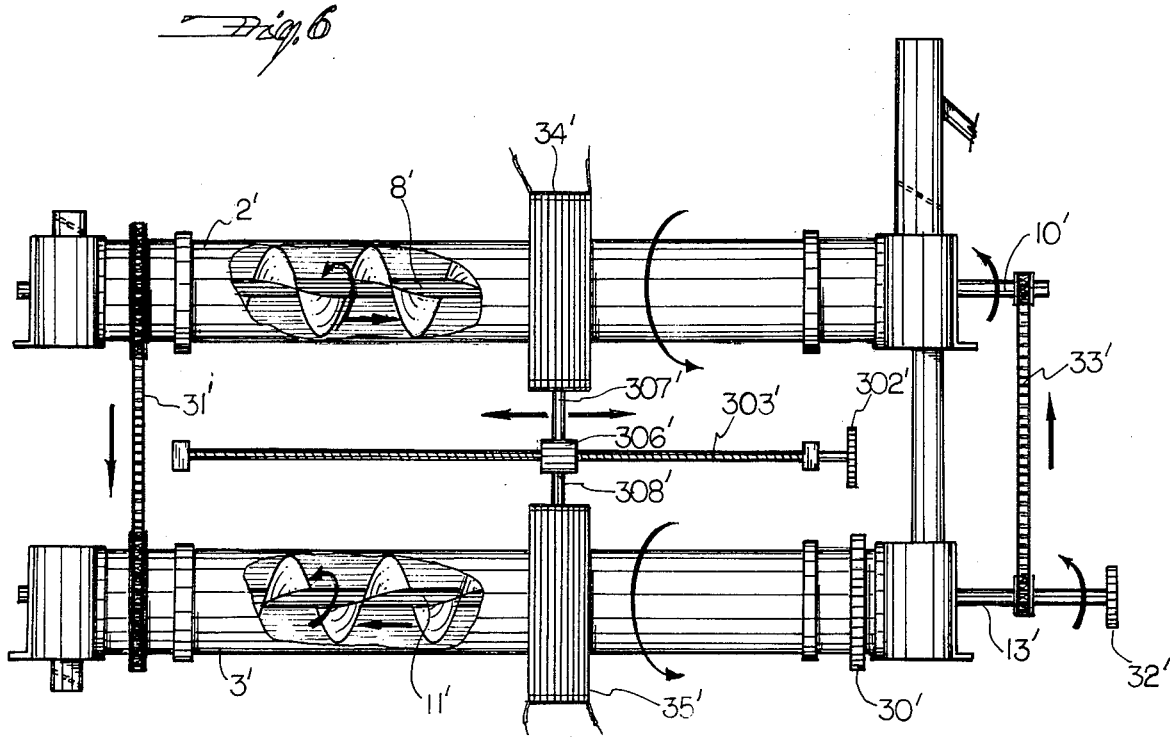

FIG. 4 is a cross-sectional view of the apparatus of FIG. 1, taken along sectional line B–B', FIG. 5 is a general schematic view of the apparatus of the present invention, showing relative material movement; and FIG. 6 is a general schematic view of the apparatus of the present invention, showing relative rotation of the various components of the apparatus.

In FIG. 1, apparatus 1 includes upper retort vessel 2 and lower retort vessel 3. Upper retort vessel 2 is supported by rotation support bearings 5, whereas lower retort tube 3 is supported by rotation support bearings 6, 7. Each set of bearings is supported on suitable journals (not shown).

Located inside of upper retort vessel 2 is auger-type conveyor 8, having the ends 9, 10 thereof supported by supporting bushing which are vertically adjustable (not shown). Likewise, lower retort vessel 3 contains auger-type conveyor 11 having the shaft ends 12, 13 thereof supported in vertically adjustable support bushings (not shown). The end of upper retort vessel 2 closest to bearing 4 extends into feed box 14 through stuffing box 15. Feed inlet 16 is located on top of feed box 14, and contains lead seal fire dampener 17. The end of upper retort vessel 2 closest to bushing 5 is received into discharge box 18 and suffing box 19. The end of lower retort vessel 3 closest to bearing 7 is received in feed box 20, having stuffing box 21 therein, and the end of lower retort tube 3 closest to bearing 6 is received in discharge box 22 which has stuffing box 23 therein. At the lower end of discharge box 22 is located solid outlet 24, having lead seal fire dampener 25 therein. Transfer tube 26 extends between discharge box 18 and feed box 20, and is mounted generally vertically so that material leaving discharge box 18 falls under the force of gravity to feed box 20. In addition, transfer tube 26 permits gases separated from solids in retort vessel 3 to pass upward into discharge box 18. At the upper end of discharge box 18 is located smoke stack 27 having lead seal fire dampener 28 therein. Air eductor 29 maintains a slight vacuum inside of the apparatus to facilitate removal of gases from solids therein. Drive gear 30 located on lower retort vessel 3 is driven by a suitable motor (not shown) through gears (not shown) to cause the retort tube 3 to rotate. Slave drive 31 causes retort vessel 2 to rotate at the same speed and in the same direction as retort vessel 3. The outer end of shaft 13 of auger-type conveyor 11 contains an auger primary drive gear 32, which is driven by a suitable motor (not shown) by suitable gears (not shown), to cause auger 11 to rotate in a direction which is opposite the rotational direction of retort tube 3. Slave drive 33 extends between shaft 13 and shaft 10, and causes auger-type conveyor 8 to rotate at the same speed and in the same direction as auger 11.

Retort vessel 2 is heated by induction heating coil 34, and retort vessel 3 is heated by induction heating coil 35, with induction heating coils 34, 35 connected by suitable leads (not shown) to a source of electricity. Each induction heating coil is located around its associated retort vessel, and is supported therefrom by conventional means (not shown). Coils 34, 35 are connected by yoke 36, which includes offset yoke segment 37, 38, which are engagable by lip 39 on spocket chain 40. Spocket chain 40 extends between spocket 41 and spocket 42, with spocket 42 driven by a suitable motor (not shown). To avoid hot spots in the drill cuttings or other solids being heated, the induction heating coils are continuously moved along the length of the retort vessels during operation.

If desired, one or more additional sets of conduction heating coils can be installed on the retort vessels, adjacent stuffing boxes 15 or 19 or 21 or 23.

Lines 43, 44 are provided to supply carbon dioxide or steam or other inert gas to discharge box 22 or feed box 14, respectively. In case of emergency, the passage of an inert gas through one or both of these lines will extinguish fires or reduce risk of explosion.

Preferably, hydrocarbon sniffer "detectors" and thermocouplers are located in discharge box 18, transfer tube 26, feed box 20, and discharge box 22 in order to monitor the hydrocarbon removal from the drill cuttings or other solids being treated.

Auger-type conveyor 8 has a auger screw 45 mounted on shaft 46, and scratchers 47, suitably of springy airplane wire in the form of a figure 8, are located between the blades of the auger in order to scrape the inside surface of the retort tube to remove additional adherent residual material. The arrangement of auger-type conveyor 11 is similar to that of auger-type conveyor 8.

With the compact arrangement of the apparatus of FIG. 1, the apparatus is suitable for use on off-shore oil and gas drilling platforms, wherein space is at a premium. The two augers in series ensure substantially complete removal of oil and other hydrocarbons from drill cuttings. With the coils traveling along the length of the retort vessels during operation, a relatively uniform heat is produced in the materials inside of the vessels so that the hot spots are avoided or minimized.

It is greatly preferred that the heating be conducted by induction heating coils, as the vessel contents are thereby quickly heated to the desired temperatures and open flames are eliminated, so that risk of fire and/or explosion is minimized. The heating should be at least to 350° F. in order to obtain adequate hydrocarbon removal, and should be no greater than 600° F., as above that temperature the danger of fire becomes substantial. It is greatly preferred that the vessel contents be heated to a temperature of 400° F. to 450° F. as it has been found that temperatures within this range provide good removal of hydrocarbons from the drill cuttings or other solids, without requiring undue amounts of energy.

The speed of material travel through the apparatus depends upon the feed rate of incoming material and upon the rotation rate of the vessels and the counter rotating auger contained therein. Normally the vessel and the auger are relatively rotated at a speed of at least 1/5 of a revolution per minute, more preferably at least 1 revolution per minute, most preferably about 2 revolutions per minute. Faster speeds can, of course, be utilized but do not provide any great advantage and consume more energy. The speed should not be so fast that the hold up time of the material in the apparatus is so short that incomplete hydrocarbon removal from the drill cuttings will be achieved, and normally will not exceed 50–80 revolutions per minute. The vessel may be rotated slightly faster than the auger.

In place of induction heating coils, other types of heating can be used as decidedly less preferred embodiments of the invention, including ultrasonic heating, microwave radiation heating, pulse laser beam heating, electrical resistance heating, open flame heating, and the like. Normally the retention time of solids traveling through the apparatus of the present invention will vary from about 4 minutes to several days, preferably 5 to 25 minutes. The retort vessel diameter can vary from ½ foot or even less to a diameter of several feet or even more, but conveniently is within the range of 1–2 feet in internal diameter. The length of the vessel or vessels will be determined by the desired retention time of solids in the vessel, as well as the desired feed rate of solids to the vessel. Within these parameters, however, the vessel length can vary widely. For instance, vessels as short as 5 feet or as long as 30 feet could be, but preferably the vessel will be of a length of 8 to 15 feet. If greater vessel lengths are desired, it is possible to use an additional number of retort vessels, each with it counter-rotating auger-type conveyor therein, in addition to the two such vessels illustrated in FIG. 1.

The augers 8, 11 in the retort vessels will preferably be eccentrically located in the retort vessel, with the auger center line being located vertically below the retort vessel center line. This arrangement will provide for good scraping of the materials on the bottom of the retort vessel, while providing good clearance at other points between the auger and the vessel. Preferably the auger has a clearance of $\frac{1}{2}$ to $\frac{1}{4}$ inch, preferably about 1/16 inch, at the bottom of the retort vessel, and a clearance of $\frac{1}{2}$ inch or more at the top of the retort vessel. For a 16 inch internal diameter retort vessel, a suitable auger may be 14 inches in diameter, with the rotational axis of the auger being located 15/16 inch below the rotation axis of the retort vessel, providing a clearance of 1/16 inch on the bottom of the vessel, and of 1 and 15/16 inches at the top of the vessel.

In order to further minimize the possibility of material being retained within the retort vessel, the auger, the vessel, or both, may be subjected to periodic or continuous vibrations, but this is not normally necessary.

The vacuum which is exerted upon the interior of apparatus 1 by air eductor 29 can vary within wide limits. Normally a vacuum of at least 0.02 inch of water, preferably about 1 inch of water, will be utilized and much higher vacuum levels, up to 15 or 20 inches of mercury, can be used but are not required.

FIG. 2 is a cross-sectional view of the apparatus of FIG. 1 or of FIG. 3, taken along the lines B-B', and shows the eccentric placement of auger-type conveyor 11. Conveyor 11 includes a shaft 201 and auger screw conveyor blade 202. Shaft 201 is located vertically below the axis 203 of the retort vessel 3.

FIG. 3 illustrates another embodiment of the apparatus of the present invention. Apparatus 301 includes upper retort vessel 2' and lower retort vessel 3', each having associated induction heating coil 34' or 35'. Apparatus 301 is identical to apparatus 1 of FIG. 1, except for the induction heating coil travel drive. Drive gear 302 is turned by a motor (not shown) operating through appropriate gears (not shown), and turns reversing or double cut induction drive helix shaft 303. Shaft 303 is supported by helix drive support bearings 304, 305. Induction heating coil drive box 306 travels along shaft 303, and is connected by way of arm 307 and 308 to induction heating coil 304' and 305' respectively.

FIG. 4 represents a cross-sectional view of retort vessel 2 of FIG. 1 or retort vessel 2' of FIG. 3, and illustrates the retention device 401 located at the discharge end of auger-type conveyor blade 45. Retention plate 402 is mounted around shaft 10 at the end of blade 45. Slots 403 are formed in plate 402, and are partially blocked by adjustable plate 404. Plate 404 is adjusted by means of adjustable mounting members 405, 406, which extend out of the top of discharge box 18. Knurled adjusting nuts (not shown) on the upper threaded ends of members 405, 406 permit adjustment of plate 404. (For clarity, the ends of members 405, 406, and associated nuts, are not shown in FIGS. 3, 5 or 6).

FIG. 5 is a schematic illustrating the flow of solid materials in the apparatus of FIG. 1. Material enters by way of feed inlet 16 into feed box 14, and then passes through retort vessel 2 under the influence of conveyor 8. At the end of conveyor 8 the material passes into discharge box 18, from which it falls under the force of gravity to transfer tube 26 into feed box 20. From feed box 20 material is picked up conveyor 11 and forced through retort vessel 3 to discharge box 22, from which it falls by the force of gravity through discharge line 14.

FIG. 6 is a schematic representation of the direction of rotation of the various elements of FIG. 3. Lower retort vessel 3' is rotated by a motor acting through gears upon drive gear 30', which causes retort vessel 3' to rotate in the indicated direction. Retort vessel 2' is caused to rotate in the same direction by way of slave drive 31'. Auger primary drive 32' is rotated by a motor operating through suitable gears, and auger primary drive 32' and attached shaft 13' rotate in the indicated direction which is opposite the rotation of retort vessel 3'. Shaft 13' in turn rotates auger-type conveyor 11' in the same relative direction, which is in counter rotation to the direction of rotation of the retort vessel 3'. The rotation of shaft 13' causes a rotation of shaft 10', by way of slave drive 33'. Shaft 10' rotates in a direction opposite the direction of rotation of retort vessel 2', and in turn causes screw conveyor 8' to rotate in the same direction as shaft 10'.

Finally, rotation of helix drive gear 302' causes shaft 303' to revolve, which causes the induction coil drive box 306' to travel back and forth along the length of shaft 303'. Drive box 306' is rigidly connected through members 307' and 308' to induction heating coil 34' and 35' which travel back and forth along the length of the respective retort vessels 2' and 3'.

In a similar fashion, sprocket 42 of FIG. 1 causes chain 40, with associated lip 39, to revolve around sprockets 41 and 42. Lip 39 pushes the induction heating coils along, acting either on lip 37 or lip 38, so that coils 34, 35 travel back and forth along the length of the respective retort vessels 2, 3.

The retort vessel diameter and length, as well as the speed of rotation of the retort vessel and the auger-type conveyor, can vary widely depending upon a number of variables, including the feed rate of incoming material, the temperature to which the material being treated is subjected, and the desired material retention time within the apparatus. A typical apparatus of FIG. 1 might have retort vessels 10 feet long and $12\frac{3}{4}$ inches in diameter, having a 12 inch diameter auger located therein. The retort vessel might rotate at a speed of 1 revolution per minute in one direction, with the auger rotating at a speed of 1 revolution per minute in the opposite direction. The auger may have a clearance of 1/16 to inch at the bottom of the retort vessel, with a clearance of about 11/16 inch at the top of the retort vessel.

I claim:

1. Apparatus for removing hydrocarbons from drill cuttings, said apparatus including
   (a) a first rotatable, cylindrical, substantially horizontal retort vessel;
   (b) a second rotatable, cylindrical, substantially horizontal retort vessel;
   (c) a first rotatable auger-type conveyor means in said first vessel for delivering solids in a downstream direction from an upstream portion to a downstream portion of said first vessel;
   (d) a second rotatable auger-type conveyor in said second vessel for delivering solids in a downstream direction from an upstream portion to a downstream portion of said second vessel;
   (e) means to rotate said first and second vessels in a first direction;

(f) means to rotate said first and second conveyor means in a second direction which is opposite said first direction;
(g) feed means to introduce drill cuttings containing hydrocarbons into the upstream end of said first vessel;
(h) transfer means to transfer solids passing through said first vessel to the upstream end of said second vessel;
(i) induction heating means for heating the contents of said vessels to thereby separate hydrocarbons as a gas stream from solid drill cuttings;
(j) travelling means for moving said induction heating means along said vessels during heating of said drill cuttings;
(k) first discharge means for discharging solid drill cuttings from the downstream end of said second vessel; and
(l) second discharge means for discharging gaseous hydrocarbons from said vessels.

2. Apparatus of claim 1 wherein said first vessel is located vertically above said second vessel, with the downstream end of said first vessel generally lying over the upstream end of said second vessel, and the upstream end of said first vessel generally lying over the downstream end of said second vessel.

3. The apparatus of claim 1 wherein said transfer means is a gravity chute for conveying materials substantially under the force of gravity from said first vessel to said second vessel.

4. Apparatus of claim 1 wherein said induction heating means is an induction heating coil for heating the contents of said vessel to a temperature of 350° F. to 600° F.

5. Apparatus of claim 1 wherein said second discharge means includes means for discharging gaseous hydrocarbons from the downstream end of said first vessel and from the upstream end of said second vessel.

6. In an apparatus for removing hydrocarbons from solid materials, said apparatus comprising at least one cylindrical, substantially horizontal retort vessel, an auger-type conveyor in said vessel and means to rotate said conveyor to move solids from an upstream portion to a downstream portion of said vessel, feed means for introducing solid materials containing hydrocarbons into said upstream portion of said retort vessel, solids removal means for removing solids from a downstream portion of said vessel, heating means for heating said solid materials containing hydrocarbons between said feed means and said solids removal means, and gas removal means for removing gas from said vessel, the improvement comprising means for rotating said vessel in a direction which is opposite the rotational direction of said auger-type conveyor, whereby the possibility of material hold up in said vessel is reduced and more uniform temperatures are established, and said heating means being induction heating means, and traveling means for causing said induction heating means to travel along the major axis of said retort vessel during operation of said apparatus.

7. Apparatus of claim 6 wherein said induction heating means is an induction heating coil for heating the vessel contents to a temperature of 350° F. to 600° F.

8. Method for removing hydrocarbons from oil and-/or gas well drill cuttings to render said drill cuttings disposable from an environmentally acceptable view, said method comprising introducing drill cuttings containing hydrocarbons into a rotatable, cylindrical, substantially horizontal retort vessel at an upstream end of said vessel, transporting said drill cuttings through said vessel while it is rotating by a rotatable, auger-type conveyor which is rotated in a direction opposite the rotation of said vessel, heating the drill cuttings during passage through the vessel by an induction heating coil to a temperature which gasifies hydrocarbons in the drill cuttings, moving the induction heating coil along the length of said retort vessel during the heating step, discharging drill cuttings substantially free of hydrocarbons from said vessel, and discharging gaseous hydrocarbons removed from said drill cuttings from said vessel.

9. Method of claim 8 wherein the drill cuttings are heated to a temperature of 350° F. to 600° F. during passage through said vessel.

10. Method of claim 8 wherein the drill cuttings are heated to a temperature of 400° F. to 450° F. during passage through said vessel.

11. Method of claim 8 wherein the relative motion of said vessel and said conveyor is at a speed of at least 1/5 of a revolution per minute.

12. Method of claim 11 wherein said speed is at least 1 revolution per minute.

13. Method of claim 8 wherein the conveyor in said vessel is located eccentrically therein, and towards the bottom thereof, to thereby scrape drill cuttings from the bottom of said vessel.

14. Method of claim 8 wherein said method includes passing the drill cuttings through two retort vessels located in series, each of said vessels having counter rotating augers located therein, one of said vessels being located vertically above the other.

15. Apparatus of claim 14 wherein drill cuttings are passed from the vertically upper vessel to the vertically lower vessel by gravity.

16. Method of claim 8 wherein the vessel and the auger are rotated at approximately the same speed.

17. Apparatus for removing hydrocarbons from drill cuttings, said apparatus including
(a) at least one rotatable, cylindrical, substantially horizontal retort vessel;
(b) a rotatable auger-type conveyor means in said vessel for delivering solids in a downstream direction from an upstream portion to a downstream portion of said vessel;
(c) means to rotate said vessel in a first direction;
(d) means to rotate said conveyor means in a second direction which is opposite said first direction;
(e) feed means to introduce drill cuttings containing hydrocarbons into the upstream end of said vessel;
(f) induction heating means for heating the contents of said vessel to thereby separate hydrocarbons as a gas stream from solid drill cuttings;
(g) travelling means for moving said induction heating means along said vessel during heating of said drill cuttings;
(h) solid discharge means for discharging solid drill cuttings from the downstream end of said vessel;
(i) gas discharge means for discharging gaseous hydrocarbons from said vessel.

* * * * *